US012605654B2

(12) United States Patent
O'Neill

(10) Patent No.: US 12,605,654 B2
(45) Date of Patent: Apr. 21, 2026

(54) WASTE WATER TREATMENT APPARATUS

(71) Applicant: Environmental Products & Services Limited, Newry (GB)

(72) Inventor: James O'Neill, Newry (GB)

(73) Assignee: Environmental Products & Services Limited, Newry (GB)

( * ) Notice: Subject to any disclaimer, the term of this patent is extended or adjusted under 35 U.S.C. 154(b) by 321 days.

(21) Appl. No.: 18/029,620

(22) PCT Filed: Sep. 27, 2021

(86) PCT No.: PCT/EP2021/076535
§ 371 (c)(1),
(2) Date: Mar. 30, 2023

(87) PCT Pub. No.: WO2022/073790
PCT Pub. Date: Apr. 14, 2022

(65) Prior Publication Data
US 2023/0356115 A1    Nov. 9, 2023

(30) Foreign Application Priority Data

Oct. 5, 2020    (GB) ..................................... 2015740

(51) Int. Cl.
*C02F 1/00*        (2023.01)
*B01D 17/02*       (2006.01)
(Continued)

(52) U.S. Cl.
CPC ...... *B01D 21/2438* (2013.01); *B01D 17/0211* (2013.01); *B01D 21/0036* (2013.01);
(Continued)

(58) Field of Classification Search
CPC .. B01D 21/2444; B01D 21/245; B01D 21/30; B01D 17/0211; B01D 21/0036;
(Continued)

(56) References Cited

U.S. PATENT DOCUMENTS

| | | | |
|---|---|---|---|
| 1,903,623 | A | 4/1933 | Howe |
| 2,353,993 | A | 7/1944 | Cavicchioli |
| | | (Continued) | |

FOREIGN PATENT DOCUMENTS

| | | |
|---|---|---|
| AU | 2835997 | 1/1998 |
| CA | 2539804 | 9/2007 |
| | (Continued) | |

OTHER PUBLICATIONS

International Search Report and Written Opinion of the International Searching Authority from corresponding European Application No. PCT/EP2021/076535, mailed Jan. 7, 2022.

*Primary Examiner* — Bobby Ramdhanie
*Assistant Examiner* — William Addison Geisbert
(74) *Attorney, Agent, or Firm* — Gardner, Linn, Burkhart & Ondersma LLP

(57) ABSTRACT

A waste water treatment apparatus includes a housing having a settling tank mounted therein, the settling tank adapted to receive waste water. A skimming device is mounted in the settling tank to remove any fats, oils, or grease ("FOG") that settles on the surface of the waste water. A drain is provided in a downstream end of the settling tank for removing water from the settling tank. An inlet end of the drain is defined by a weir that controls the water level within the settling tank. A sediment removal system adapted to remove sediment collected in the bottom of the settling tank.

19 Claims, 3 Drawing Sheets

(51) Int. Cl.

| | | |
|---|---|---|
| *B01D 21/00* | (2006.01) | |
| *B01D 21/24* | (2006.01) | |
| *B01D 21/30* | (2006.01) | |
| *C02F 1/40* | (2023.01) | |
| *C02F 101/32* | (2006.01) | |
| *C02F 103/32* | (2006.01) | |

(52) U.S. Cl.
CPC ....... *B01D 21/0042* (2013.01); *B01D 21/245* (2013.01); *B01D 21/30* (2013.01); *C02F 1/001* (2013.01); *C02F 1/40* (2013.01); *C02F 2001/007* (2013.01); *C02F 2101/32* (2013.01); *C02F 2103/32* (2013.01); *C02F 2209/008* (2013.01); *C02F 2209/02* (2013.01); *C02F 2209/11* (2013.01); *C02F 2209/22* (2013.01); *C02F 2209/42* (2013.01)

(58) Field of Classification Search
CPC ............ B01D 21/0042; B01D 21/2433; B01D 21/2438; C02F 1/001; C02F 1/40; C02F 2001/007; C02F 2101/32; C02F 2103/32; C02F 2209/008; C02F 2209/02; C02F 2209/11; C02F 2209/22; C02F 2209/42; E03F 5/16
USPC ....................................................... 210/97
See application file for complete search history.

(56) References Cited

U.S. PATENT DOCUMENTS

| | | | |
|---|---|---|---|
| 2,491,912 A | 12/1949 | Walker | |
| 2,782,929 A | 2/1957 | Colket | |
| 3,685,654 A * | 8/1972 | MacLellan | B01D 21/2427 |
| | | | 210/531 |
| 4,855,065 A * | 8/1989 | Keeter | B04C 9/00 |
| | | | 210/776 |
| 5,069,781 A | 12/1991 | Wilkes | |
| 5,397,464 A | 3/1995 | Hannon | |
| 7,504,024 B1 | 3/2009 | Batten et al. | |
| 7,883,620 B2 | 2/2011 | Owen | |
| 9,205,352 B2 * | 12/2015 | O'Neill | B01D 21/2488 |
| 11,479,954 B2 | 10/2022 | O'Neill | |
| 2005/0211620 A1 * | 9/2005 | Owen | B01D 17/0211 |
| | | | 210/301 |
| 2007/0045182 A1 | 3/2007 | Chapin | |
| 2007/0289058 A1 | 12/2007 | Luk | |
| 2020/0038781 A1 * | 2/2020 | Anastasio | C02F 1/40 |

FOREIGN PATENT DOCUMENTS

| | | | |
|---|---|---|---|
| CN | 201185878 | 1/2009 | |
| CN | 102462213 | 5/2012 | |
| CN | 203947542 | 11/2014 | |
| CN | 206142879 | 5/2017 | |
| DE | 202008014858 | 3/2009 | |
| EP | 0282906 | 9/1988 | |
| GB | 2565548 | 2/2019 | |
| GB | 2577559 | 4/2020 | |
| GB | 2577559 A * | 4/2020 | E03F 5/16 |

* cited by examiner

WASTE WATER TREATMENT APPARATUS

CROSS REFERENCE TO RELATED APPLICATIONS

The present application is a § 371 national stage of International Application PCT/EP2021/076535, filed Sep. 27, 2021, which claims priority benefit of U.K. Pat. Application Ser. No. 2015740.0, filed Oct. 5, 2020, both of which are hereby incorporated herein by reference in their entireties.

FIELD OF THE INVENTION

This invention relates to a waste water treatment apparatus, and more especially to a waste water treatment apparatus for removing fats, oils and grease ("FOG") and solid waste from waste water, for example from a sink in a commercial kitchen.

BACKGROUND OF THE INVENTION

Typically waste water drained from a sink in a commercial kitchen or catering facility contains grease in an emulsified state, as well as grease laden solids in suspension, typically in the form of foods wastes, as well as other solid waste. Such contaminants can cause blockages in drainage systems and/or fouling of filtration systems or pumps within water treatment plants downstream of the drainage system.

Effluent from fats, oils, or grease ("FOG") contamination points in commercial kitchens typically originates from steam combination ovens, convection rotisserie ovens, pot sinks, pre-rinse sinks, dishwashers, canopies and the like. They have in common the use and application of hot water ranging in temperature from 40° C. to 85° C. for the purposes of dealing with FOG contamination, where FOG is washed away in the waste water stream from such devices.

For these reasons, depending on the country, it is often compulsory for commercial kitchen operations to fit some kind of interceptor device to collect the FOG before it enters the sewer, typically referred to as a grease trap. Additionally where FOG is a concern in the local wastewater collection system, inspection programmes have been set up to ensure that these grease traps and/or interceptors are being maintained on a routine basis.

Known grease traps range in complexity from simple settling tanks, known as "passive" grease traps, that require periodic manual grease removal, to rather complex structural arrangements that provide for automatic skimming and collection of skimmed fats, oils and grease into external containers positioned adjacent the trap assembly, commonly referred to as "automated" grease traps or GRUs.

Passive grease traps are, in essence, simply a settling tank having a wastewater inlet at one end and an outlet at an opposite end for connection to a drain. Often baffle plates are arranged within the tank to interrupt direct flow-through of wastewater between the inlet and the outlet. Periodically, an employee must manually skim the FOG that has accumulated at the surface of the wastewater.

Automated grease traps include automatic skimmer arrangements, typically utilising a skimmer device, in the form of a disc, drum, endless belt or tube, mounted above the tank and connected to a drive arrangement to move the skimming device through the layer of FOG floating on the waste water within the tank of the grease trap. The skimming device collects FOG from the surface of the water in the tank and is subsequently cleaned by means providing a scraping or squeezing action on the skimming device, such as wiper blades, arranged to direct the collected FOG into a collection device before the skimming device passes back into the water. The collection device is typically a separate container or reservoir located on one side of the tank.

Known grease traps require a regular maintenance programme to be carried out to pump out such traps and refill with clean water. The European Standard EN 1825 calls for grease traps to be pumped monthly and preferentially fortnightly. In so far as grease traps contain some if not all of the entrained FOG and food wastes, these separate, with FOG having a specific gravity of less than 1 rising to the surface and food waste having a specific gravity greater than 1 sinking to the bottom.

While skimmer devices may continuously remove FOG from the surface of the water in the tank, food waste and other solids material carried in the waste water collects in the bottom of the tank as organic sediment. If this is not attended to, indigenous mesophilic bacteria will deplete the dissolved oxygen in the effluent leading to offensive malodours in commercial kitchens and unpleasant working conditions for staff and may require frequent decommissioning of the tank for removal of the sediment.

SUMMARY OF THE INVENTION

According to the present invention there is provided a waste water treatment apparatus comprising a housing having a settling tank mounted therein adapted to receive waste water, a skimming device being mounted in the settling tank to remove any fats, oils, or grease ("FOG") that settles on the surface of the waste water, a drain being provided in a downstream end of the settling tank for removing water from the settling tank, an inlet end of the drain being defined by a weir which controls the water level within the settling tank, and a sediment removal system adapted to remove sediment collected in the bottom of the settling tank.

Optionally, the sediment removal system comprises a sediment removal pump having an inlet coupled to a sediment extraction passage extending into a sediment collection region in the bottom of the settling tank and adapted to draw sediment accumulated in the sediment collection region of the settling tank.

Optionally, a bottom wall of the settling tank slopes downwardly towards the sediment collection region and towards an inlet end of the extraction passage within the settling tank to encourage sediment to move towards the inlet end of the extraction passage.

The sediment removal pump may be adapted to pump sediment from the settling tank, as a slurry, into the drain of the settling tank or, alternatively, into a separate collection vessel or drain outlet.

In one embodiment the settling tank may comprise first and second oppositely disposed end walls spaced apart by first and second oppositely disposed side walls, a longitudinal baffle or dividing wall extending inwardly from the first end wall towards the second end wall, parallel to the first and second side walls, the dividing wall terminating adjacent the second end wall such that the dividing wall divides the interior of the settling tank into an inlet region and a settlement region, the skimming device and the sediment removal system being associated with the settlement region. The dividing wall may be positioned adjacent the first side wall of the tank such that the inlet region of the tank is narrower than the settlement region.

In one embodiment a pair of parallel vertically arranged baffle plates may extend across the width of the settlement region of the settling tank between the dividing wall and the second side wall of the settling tank, the baffle plates having lower edges terminating above the bottom wall of the settling tank and upper edges extending above the normal water level in the settling tank, the baffle plates being spaced apart from one another to define a cavity therebetween, wherein the inlet end of the sediment extraction passage extends into the cavity through one of the baffle plates such that the cavity defines an inlet region of the sediment extraction passage. The cavity may serve as a vent for the sediment removal pump.

The sediment extraction passage may be defined by a pipe extending from the sediment removal pump into the settling tank and terminating in the cavity. An inlet end of the sediment extraction pipe may extend into the cavity through one of the baffle plates.

Optionally, the drain of the settling tank extends from a rear wall of the housing.

In one embodiment a waste water collection tank may be mounted within the housing adjacent the settling tank serving as a solid waste interceptor, a food waste collection tray being located within the waste water collection tank for collecting solid waste therein. A removable strainer basket may be mounted within the food waste collection tray for collecting food waste and other solid waste therein, the strainer basket incorporating apertures or slots, such that waste water can pass through the strainer basket, while solid waste entrained within the waste water is collected within the strainer basket. Waste water, containing FOG and entrained food waste and other solids, for example from a sink drain, may be fed into the strainer basket in the waste water collection tank via an inlet pipe feeding through feed holes in a rear wall of the tray and rear wall of the basket. A bottom wall of the food waste collection tray may be perforated to allow water to drain therethrough into the waste water collection tank. A bottom wall of the waste water collection tank may incorporate a drain gulley at the lowermost point thereof, leading into a downwardly sloping supply channel communicating with the settling tank. A further strainer may be provided between the waste water collection tank and the supply channel, the further strainer optionally being a perforated section of the bottom wall of the food waste collection tray through which waste water must pass to reach the supply channel.

The skimming device may comprise an elongate drum having a surface coated with or formed from a hydrophobic and oleophilic material, the drum being mounted in the settling tank to be partially submerged in waste water held in the tank when in use, the drum being mounted in the tank to be rotatable, under the action of a motor. A FOG collection tank may be mounted on one side of the housing adjacent the skimming device and includes a scraper or wiper blade arranged to engage the surface of the drum of the skimming device to scrape FOG from the surface thereof and deliver the FOG into the collection tank.

One or more sensors may be associated with the settling tank adapted to measure one or more of the dissolved oxygen-n content of the water in the settling tank, the level of settled out FOG on top of the water in the settling tank, the temperature of the water in the settling tank and the turbidity of the water. The one or more sensors may comprise non-contact sensors that are not in direct contact with the waste water. Data from the one or more sensors may be transmitted via a wired or wireless communication means to a central monitoring and/or control centre, to facilitate monitoring and management of the apparatus or of multiple installations.

These and other objects, advantages, purposes and features of the present invention will become apparent upon review of the following specification in conjunction with the drawings.

BRIEF DESCRIPTION OF THE DRAWINGS

A waste water treatment apparatus in accordance with an embodiment of the present invention will now be described, by way of example only, with reference to the accompanying drawings, in which:—

DETAILED DESCRIPTION OF THE DRAWINGS

Figure 1:
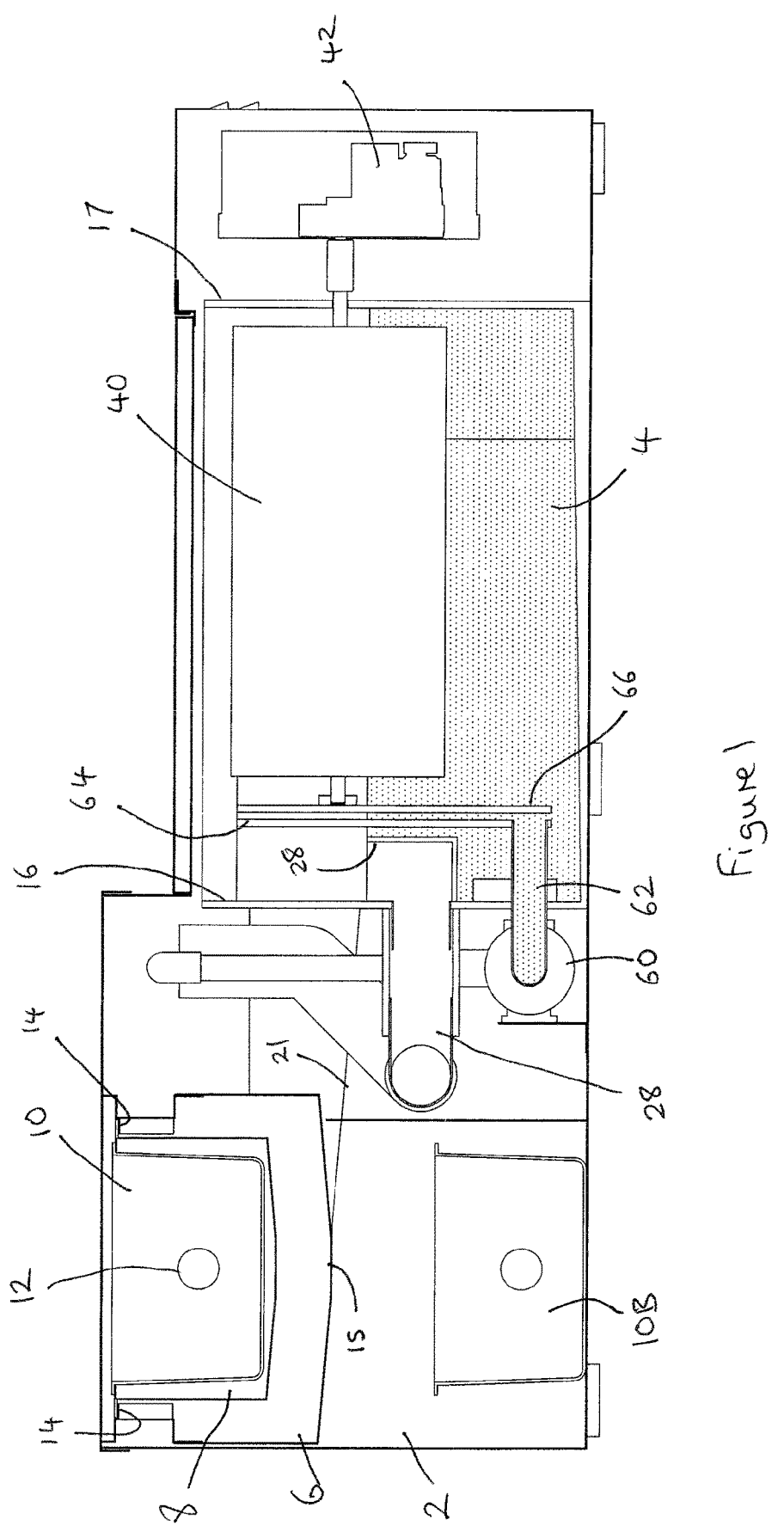
FIG. 1 is a front view of a waste water treatment apparatus in accordance with an embodiment of the present invention.

As illustrated in the drawings, a waste water treatment apparatus in accordance with an embodiment of the present invention comprises a substantially rectangular housing 2 having a settling tank 4 mounted therein to define a grease trap wherein FOG separated from the waste water to float on the surface of the waste water before being is removed before the water is passed to a drain, thereby greatly reducing the passage of FOG into the drain.

A waste water collection tank 6 is located within the housing adjacent the settling tank 4 serving as a solid waste interceptor. A food waste collection tray 8 is located within the waste water collection tank 6, a strainer basket 10 being mounted within the tray 8 for collecting food waste and other solid waste therein. Waste water, containing FOG and entrained food waste and other solids, for example from a sink drain, may be fed into the strainer basket in the waste water collection tank 8 via the inlet pipe 12 feeding through feed holes in a rear wall of the tray 8 and rear wall of the basket 10.

The food waste collection tray 8 is slidably mounted within the waste water collection tank 6 in the manner of a drawer, the tray 8 being adapted to be slid laterally into and out of a front side of the waste water collection tank 6 between a closed position, wherein the strainer basket 10 receives waste water from the waste water inlet pipe 12, and an open position, wherein the tray 8 extends laterally from the front of the tank 2 to provide access to the strainer basket 10 to permit removal of the strainer basket 10 for emptying collected food waste therefrom. Runners 14 (FIG. 1) may be provided on the inner faces of the side walls of the tank 2 upon which the tray 8 may be supported and guided. A spare strainer basket 10B is stored in the space below the waste water collection tank 8.

A bottom wall of the food waste collection tray 8 may be perforated to allow water to drain therethrough into the waste water collection tank 6, whereby further solid waste is intercepted in the collection tray 8.

A bottom wall of the waste water collection tank 6 incorporates a central gulley 15 at the lowermost point thereof, extending parallel to side walls of the tank 6, the floor of the tank 6 typically depending downwardly on either side of the gulley 15 to facilitate the drainage of waste water into the gully 15. The gulley 15 leads into a downwardly sloping supply channel 21 communicating with the settling tank 4. The supply channel 21 reduces the velocity and turbulence of the waste water before it reaches the settling tank 4 to increase retention and removal efficiency.

A further strainer, for example a perforated section 9 of the bottom wall of the tray 8 through which waste water must pass to reach the supply channel 21, may be provided between the waste water collection tank 6 and the supply channel 21 to trap solid waste without allowing it to pass to the settling tank 4, for example should the waste water pass into the waste water collection tank 6 with the food waste collection tray 8 open.

Figure 2:
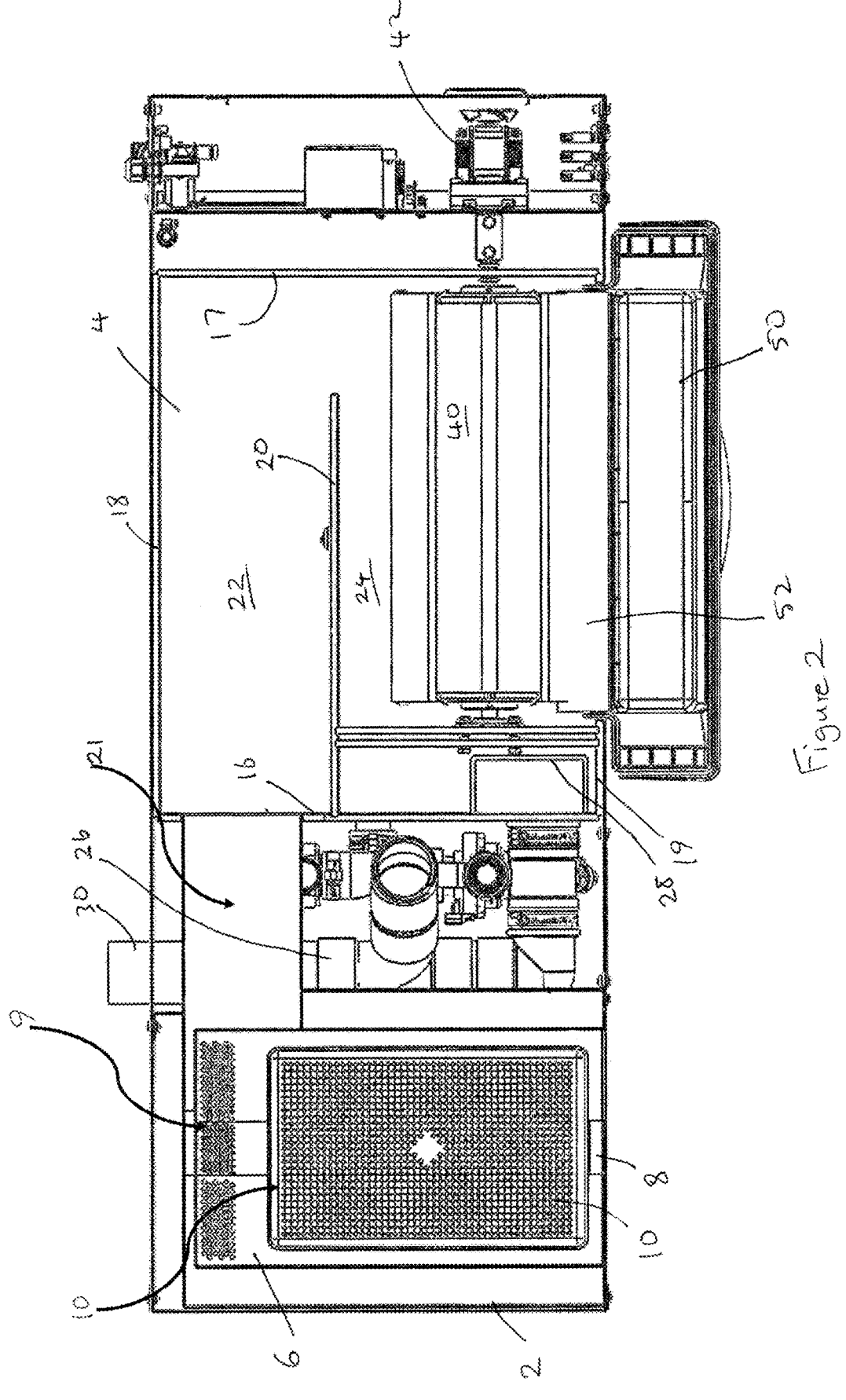
FIG. 2 is a top plan view of the apparatus of FIG. 1.
Figure 3:
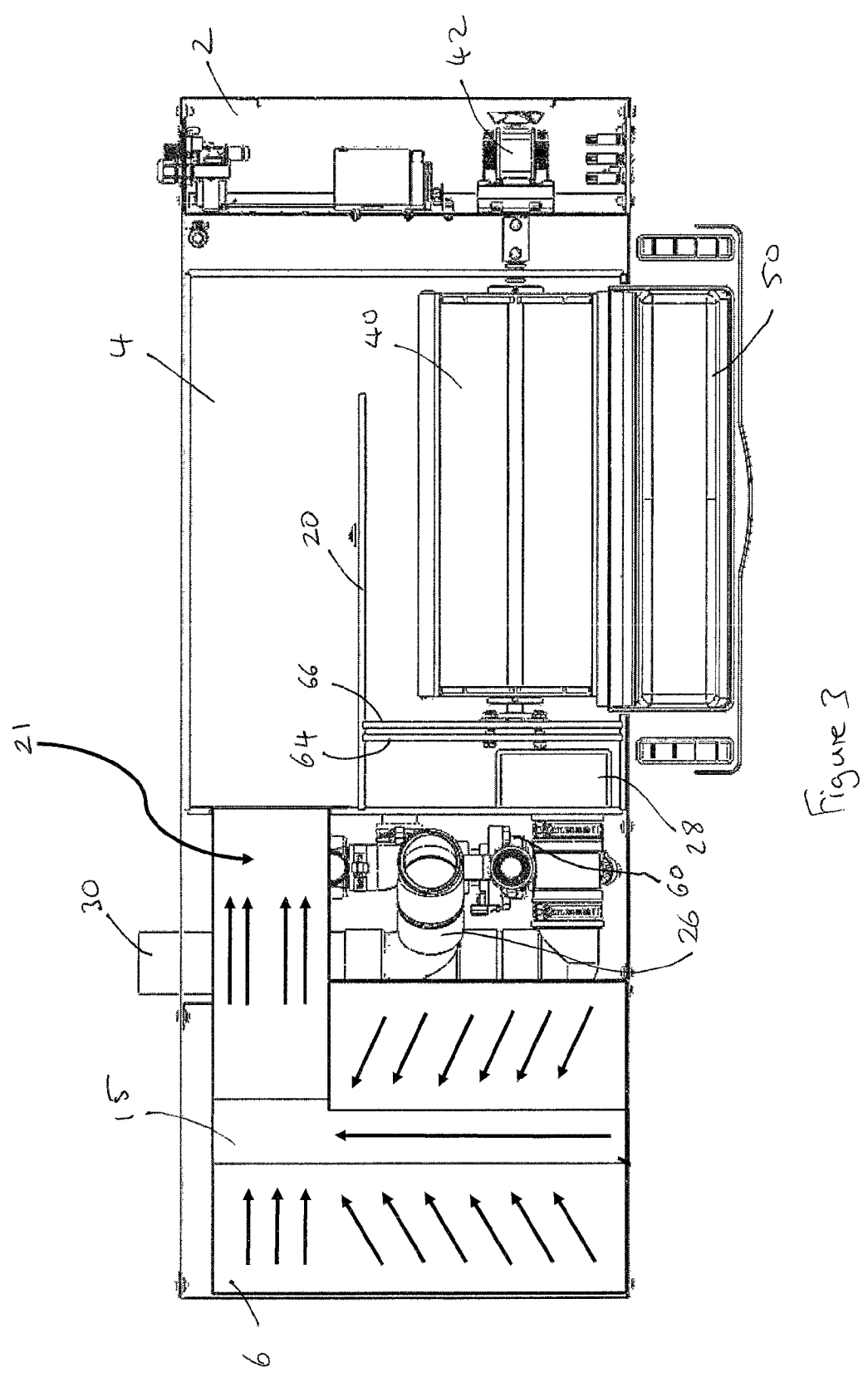
FIG. 3 is another top plan view of the apparatus of FIG. 1, shown with strainer basket removed to reveal underlying structure.

The settling tank 4 comprises first and second oppositely disposed end walls 16,17 spaced apart by first and second oppositely disposed side walls 18,19. As best shown in FIG. 2, a longitudinal baffle or dividing wall 20 extends inwardly from the first end wall 16 towards the second end wall 17, parallel to the first and second side walls 18,19, the dividing wall 20 terminating adjacent the second end wall 17. The dividing wall 20 divides the interior of the settling tank 4 into an inlet region 22 and a settlement region 24. The dividing wall 20 is positioned adjacent the first side wall 18 of the tank such that the inlet region 22 of the tank 8 is narrower than the settlement region 24.

The dividing wall 20 defines a flow path for the waste water through the settling tank 4 and effectively doubles the traverse length of the waste water through the tank 4.

The change of direction forced upon the waste water as it passes through the tank 4 also slows the flow of waste water, encouraging the separation of the FOG and water in the settlement region 24 of the settling tank 4.

A water drain 26 is provided in a downstream end of the settlement region 24 of the settling tank 4, an inlet end of the drain 26 being defined by a weir 28 which controls the water level within the settling tank 4, cleaned water overflowing the weir 28 to pass out of the tank 4 via the drain 26, an outlet end 30 of the drain 26 extending from a rear wall of the housing 2.

A skimming device is mounted in the settlement region 24 of the settling tank 6. In the embodiment shown in the drawings, the skimming device comprises an elongate drum 40 having a surface coated with or formed from a hydrophobic and oleophilic material, the drum 40 being mounted in the settlement region 24 of the settling tank 4 to be partially submerged in waste water held in the tank 4 when in use. The drum 54 is mounted in the tank 4 to be rotatable, under the action of a motor 56, to rotate about an axis extending substantially parallel to the first and second sides 16,17 of the settling tank 4.

A FOG collection tank 50 is mounted on one side of the 2 housing adjacent the second side 17 of the settling tank 4 adjacent the skimming device and includes a scraper or wiper blade 52 arranged to engage the surface of the drum 40 to scrape FOG from the surface thereof and deliver the FOG into the collection tank 50.

As shown in FIG. 2, the wiper blade 52 is mounted on an extension of one side of the FOG collection tank 50 such that the wiper blade 52 is brought into contact with the drum 40 as the FOG collection tank 50 is mounted onto the side of the housing 2. When the FOG collection tank 50 is removed to permit emptying the wiper blade 52 can be cleaned at the same time.

A best illustrated in FIG. 1, the settling tank 4 is provided with a sediment removal system, whereby sediment collected in the bottom of the tank can be automatically removed to enhance the efficiency of the apparatus, as will be described below in more detail. In prior art grease traps such sediment, primarily comprising food waste having a specific gravity greater than 1, would have to had been manually removed during periodic maintenance of the grease trap.

A sediment removal pump 60 is located in the housing 2 adjacent the first end 16 of the settling tank 4. An inlet of the pump 60 is coupled to a sediment extraction pipe extending horizontally into a sediment collection region in the settling tank 4 and adapted to draw sediment accumulated in the sediment collection region in the bottom/lowest point of the settlement region 24 of the settling tank 4. The bottom wall 61 of the settlement region 24 of the settling tank 4 may slope downwardly from the second end wall 17 towards the first end wall 16, towards an inlet end of the extraction pipe 62, to encourage sediment to move towards the extraction pipe 62. The sediment removal pump 60 may pump the sediment collected in the sediment collection region, in the form of a thick slurry, from the settling tank and into the drain 26 or, alternatively, into a separate collection vessel or drain outlet.

A pair of parallel vertically arranged baffle plates 64,66 extend across the width of the settlement region 24 of the settling tank 4 between the dividing wall 20 and the second side wall 19 of the tank 4, the baffle plates 64,66 having lower edges terminating above the bottom wall of the settling tank 4 and upper edges extending above the normal water level in the settling tank. The baffle plates 64,66 are space apart to define a relatively narrow (such as around 10 mm) cavity therebetween, the cavity serving as a vent for the sediment removal pump and also an inlet region for the sediment extraction pipe 62, with the inlet end of the sediment extraction pipe 62 extending into the cavity through one of the baffle plates and sediment passing between the lower ends of the baffle plates 64,66 to pass into the extraction pipe 62. The baffle plates 64,66 also maximise the removal of sediment by ensuring that the sediment removal pump 60 only draws slurry from the sediment collection region in the lowest point of the settling tank 4. The relatively narrow cavity defined between the baffle plates 64,66 may create a venturi effect, increasing the flow velocity at the inlet end of the extraction pipe 62, thereby enhancing sediment extraction.

A programmable controller may be provided for controlling the operation of the skimming device and the sediment removal pump. The controller may include a timer to permit the skimming device and sediment removal pump to be periodically operated at pre-programmed times and for predetermined periods.

The controller may receive inputs from a plurality of sensors associated with the settling tank, for example for measuring one or more of the dissolved oxygen content of the water in the settling tank, the level of settled out FOG on top of the water in the settling tank, the temperature of the water in the settling tank and the turbidity of the water. Optionally, non-contact sensors are used. Data from the sensors may be transmitted via a wired or wireless communication means, for example via the Internet, to a central monitoring and/or control centre, to facilitate monitoring and management of the apparatus or of multiple installations. The data collected may be used to ensure correct operation and use of the apparatus.

By eliminating contamination at source, a waste water treatment apparatus in accordance with the present invention can protect the drainage and water course systems. The use of the apparatus in accordance with the present invention may prevent blockages of FOG origin in drains and protects pumping stations whilst significantly reducing the loading on waste water treatment plants. Where sampling of effluent is practiced, significant effluent treatment charges can be applied as a result of high BOD, SS and FOG levels detected. A waste water treatment apparatus in accordance with the present invention can achieve significant reductions in the BOD; COD: FOG and SS loading levels of effluent being discharged from commercial food service premises.

The recurring need to service known grease traps and refill with clean water is eliminated, as is the costly use of biological agents, enzymes and chemicals.

The waste water treatment apparatus in accordance with the present invention can take advantage of waste thermal energy present in effluent being discharged from commercial kitchens to remove emulsified FOG, particularly saturated animal fats before they solidify. No heating elements are used thereby reducing energy and operational costs and $CO2$ related emissions. This has been quantified as approximating to a saving of up to 5 tonnes of $CO2$ related emissions in a year in comparison to passive traps and mechanical grease traps which utilise heating elements and which traps require to be pumped on a regular basis involving the use of road tankers.

The invention is not limited to the embodiment described herein but can be amended or modified without departing from the scope of the present invention as defined by the appended claims, which is intended to be limited only by the scope of the appended claims as interpreted according to the principles of patent law including the doctrine of equivalents.

The invention claimed is:

1. A waste water treatment apparatus comprising:
a housing having a settling tank mounted therein, said settling tank adapted to receive waste water, said settling tank comprising:
first and second oppositely disposed side walls;
first and second oppositely disposed end walls spaced apart by said first and second oppositely disposed side walls;
a bottom wall;
a longitudinal dividing wall extending inwardly from said first end wall towards said second end wall, parallel to said first and second side walls, said dividing wall terminating adjacent said second end wall such that said dividing wall divides an interior of said settling tank into an inlet region and a settlement region; and
a pair of parallel vertically arranged baffle plates extending across the width of said settlement region of said settling tank between said dividing wall and said second side wall;
said baffle plates having lower edges terminating above said bottom wall and upper edges extending above a normal water level in said settling tank, said baffle plates being spaced apart from one another to define a cavity therebetween;
a skimming device mounted in said settling tank and adapted to remove any fats, oils, or grease ("FOG") that settles on the surface of the waste water, said skimming device comprising a rotatable motor-driven elongate drum having a surface coated with or formed from a hydrophobic and oleophilic material, wherein said drum is positioned to be partially submerged in the waste water held in said settling tank when said apparatus is in use;
a drain provided in a downstream end of said settling tank for removing water from said settling tank;
a weir defining an inlet end of said drain, said weir adapted to control the water level within said settling tank; and

a sediment removal system adapted to remove sediment collected in said settlement region of said settling tank, wherein said sediment removal system comprises:
a sediment extraction passage having an inlet end extending into said settlement region at said bottom wall of said settling tank; and
a sediment removal pump having an inlet coupled to said sediment extraction passage, said sediment removal pump adapted to draw sediment accumulated in said settlement region out of said settling tank, as a slurry, into said drain or into a separate collection vessel or drain outlet;
wherein said inlet end of said sediment extraction passage extends into said cavity through one of said baffle plates such that said cavity defines an inlet region of said sediment extraction passage and is in fluid communication with said settlement region.

2. The apparatus of claim 1, wherein said sediment extraction passage extends horizontally into said settling tank.

3. The apparatus of claim 1, wherein said settlement region is in a lowermost region of said settling tank.

4. The apparatus of claim 3, wherein said bottom wall of said settling tank slopes downwardly towards said settlement region and towards an inlet end of said sediment extraction passage within said settling tank to encourage sediment to move towards said settlement region.

5. The apparatus of claim 1, wherein said dividing wall is positioned adjacent said first side wall such that said inlet region is narrower than said settlement region.

6. The apparatus of claim 1, wherein said cavity serves as a vent for said sediment removal pump.

7. The apparatus of claim 1, wherein said sediment extraction passage is defined by a pipe extending from said sediment removal pump into said settling tank and terminating in said cavity.

8. The apparatus of claim 1, wherein said drain of said settling tank extends from a rear wall of said housing.

9. The apparatus of claim 1, wherein a waste water collection tank is mounted within said housing adjacent said settling tank serving as a solid waste interceptor, a food waste collection tray being located within said waste water collection tank for collecting solid waste therein.

10. The apparatus of claim 9, wherein a removable strainer basket is mounted within said food waste collection tray for collecting food waste and other solid waste therein, said strainer basket incorporating apertures or slots, such that waste water can pass through said strainer basket, while solid waste entrained within the waste water is collected within said strainer basket.

11. The apparatus of claim 10, wherein waste water, containing FOG and entrained food waste and other solids, is fed into said strainer basket in said waste water collection tank via an inlet pipe feeding through feed holes in a rear wall of said food waste collection tray and a rear wall of said basket.

12. The apparatus of claim 9, wherein a bottom wall of said food waste collection tray is perforated to allow water to drain therethrough into said waste water collection tank.

13. The apparatus of claim 9, wherein a bottom wall of said waste water collection tank incorporates a drain gulley at the lowermost point thereof, leading into a downwardly sloping supply channel communicating with said settling tank.

14. The apparatus of claim 13, wherein a strainer is provided between said waste water collection tank and said supply channel.

15. The apparatus of claim 14, wherein said strainer comprises a perforated section of said bottom wall of said food waste collection tray through which waste water must pass to reach said supply channel.

16. The apparatus of claim 1, wherein a FOG collection tank is mounted on one side of said housing adjacent said skimming device, said FOG collection tank including a scraper or wiper blade arranged to engage said surface of said drum of said skimming device to scrape FOG from said surface and deliver the FOG into said FOG collection tank.

17. The apparatus of claim 1, further comprising one or more sensors associated with said settling tank and adapted to measure one or more of: the dissolved oxygen content of the water in said settling tank, the level of settled out FOG on top of the water in said settling tank, the temperature of the water in said settling tank, and the turbidity of the water.

18. The apparatus of claim 17, wherein said one or more sensors comprise non-contact sensors that are not in direct contact with the waste water.

19. The apparatus of claim 17, wherein said one or more sensors are adapted to transmit data to a central monitoring and/or control centre via a wired or wireless communications, to facilitate monitoring and management of said apparatus or of multiple apparatus installations.

* * * * *